Figure 1:
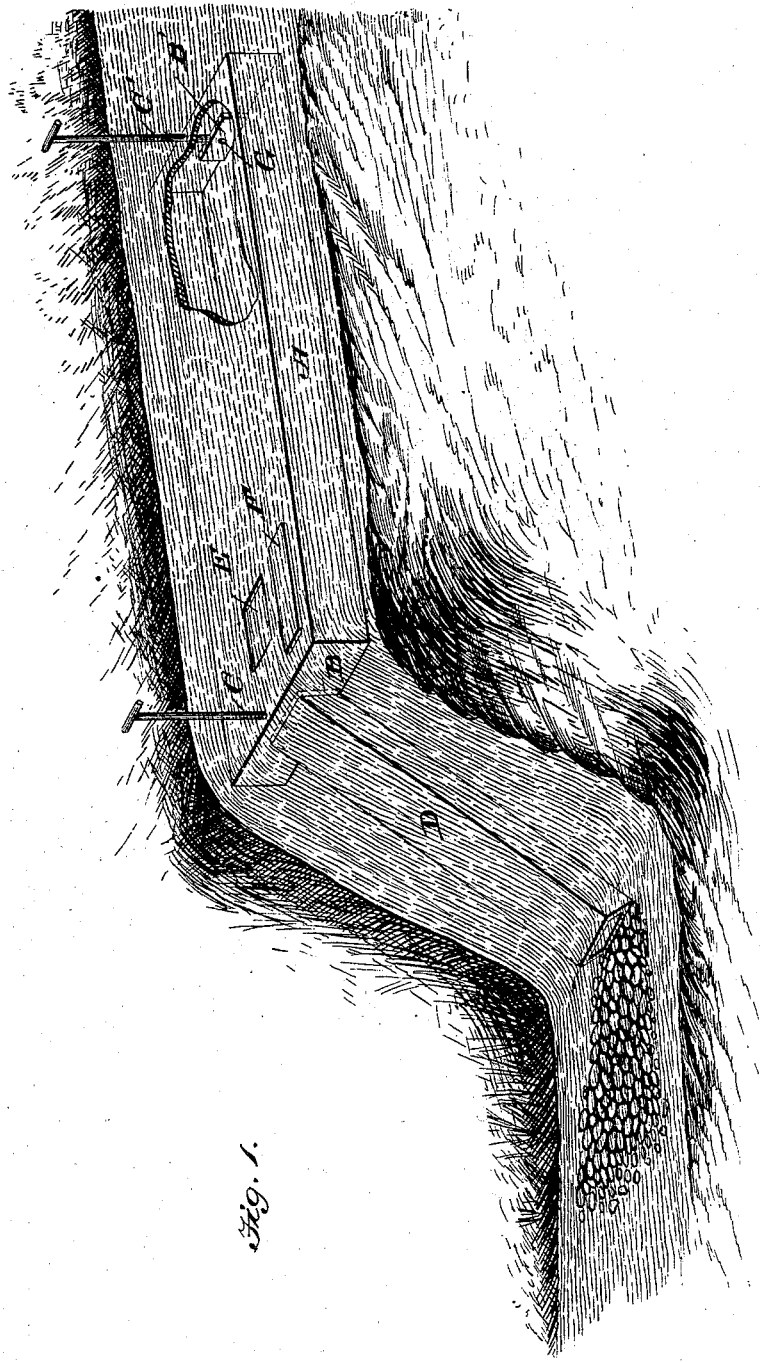

(No Model.)  2 Sheets—Sheet 1.

S. SANDERSON.
FISHWAY.

No. 474,863.  Patented May 17, 1892.

WITNESSES  INVENTOR
  Samuel Sanderson,
  By his Attorney (No Model.) 2 Sheets—Sheet 2.
S. SANDERSON.
FISHWAY.
No. 474,863. Patented May 17, 1892.
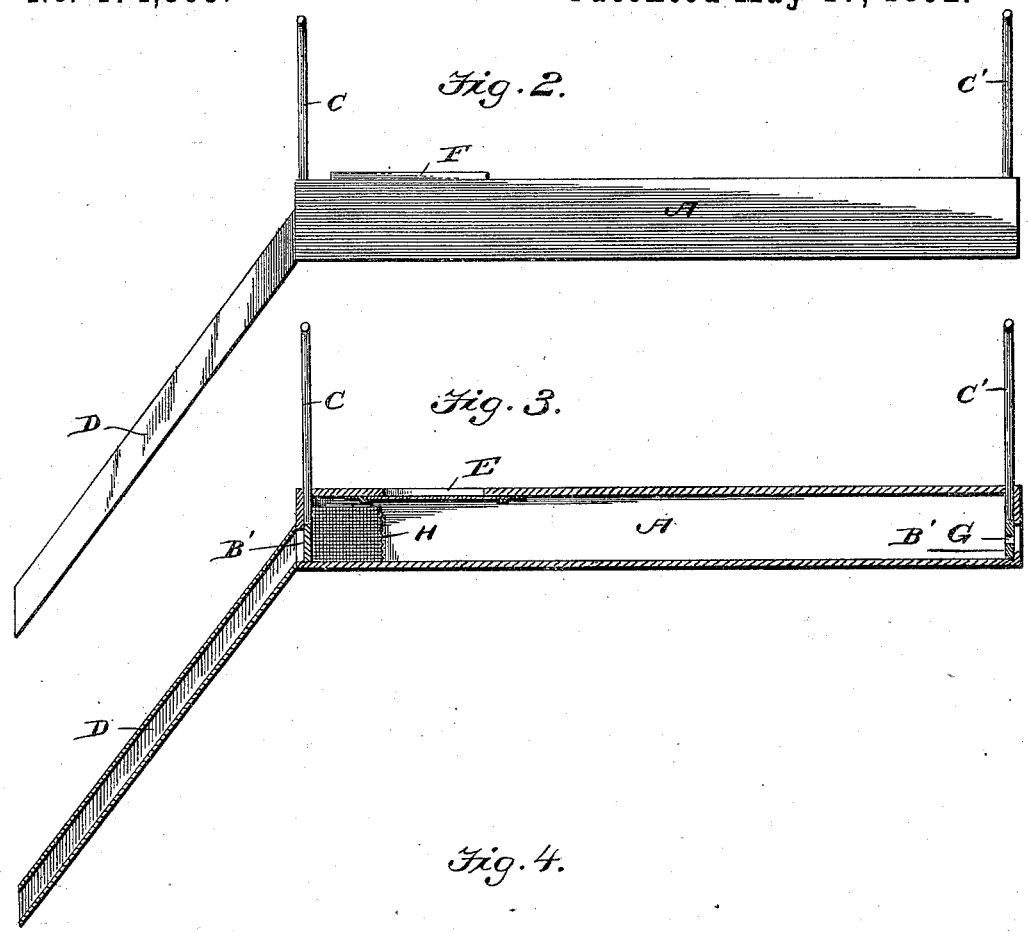
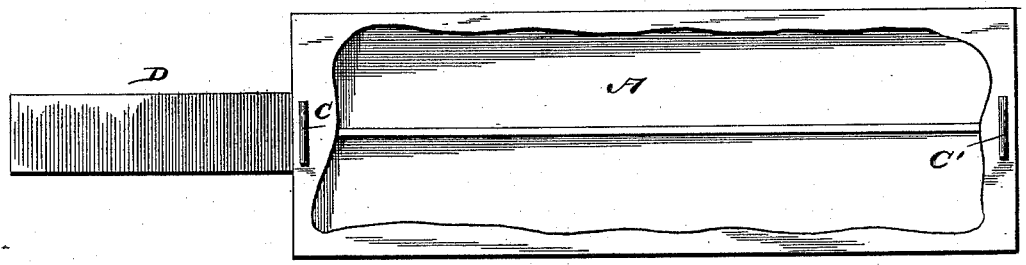
WITNESSES
INVENTOR
Samuel Sanderson,
By his Attorney

UNITED STATES PATENT OFFICE.

SAMUEL SANDERSON, OF BARTON, CANADA.

FISHWAY.

SPECIFICATION forming part of Letters Patent No. 474,863, dated May 17, 1892.

Application filed March 19, 1891. Serial No. 385,679. (No model.)

*To all whom it may concern:*

Be it known that I, SAMUEL SANDERSON, a subject of the Queen of Great Britain, residing at Barton, in the Province of Nova Scotia, and Dominion of Canada, have invented certain new and useful Improvements in Fishways; and I do hereby declare that the following is a full, clear, and exact description of the invention, which will enable others skilled in the art to which it appertains to make and use the same.

My invention relates to fishways; and it consists of the construction and arrangement of parts, hereinafter more fully set forth, and pointed out in the claims.

The object of my invention is to provide simple and efficient means for facilitating the passage of fish from a lower to a higher body of water.

In the accompanying drawings, like letters of reference are used to indicate corresponding parts, and therein—

Figure 1 represents a perspective view of my improved device in position. Fig. 2 represents a side elevation thereof. Fig. 3 represents a longitudinal vertical section. Fig. 4 represents a sectional view of a modification.

Referring to the drawings, A designates a comparatively tight tank, which is submerged in the upper or higher body of water and has gates B and B' in opposite ends adapted to be operated by staffs or vertical rods C and C'. Secured over the gate-opening B is the upper end of a spout D, made stouter than the tank A and arranged at about an angle of forty-five degrees and reaching to the body of water or stream below the position of said tank. The lower end of the spout may have a leader running thereto, if desired. A light of glass E about the size of the upper opening of the spout is arranged in the body of the top portion of the tank A in line with the spout, so as to throw light down the spout when the downstream-gate B is open. In one side of top of tank is located a trap-door F to permit removal of drift-rubbish from the tank. A small hole G is formed in the upstream gate B' to give current for the fish to follow when the downstream gate B is open, and a collar or covering H of wire net-work is mounted around the downstream gate to prevent fish from going downstream when gate B is open and when a single tank is used. The gates are opened or closed by hand or otherwise. One gate is closed and the other opened about twice a day, or as the quantity of fish passing through the tank may require.

The operation of my invention is as follows: The tank being submerged and also the lower end of the spout, the gate B' is closed and the gate B opened. In this condition the water contained within the tank and spout is held therein by atmospheric pressure; but a slight current is produced by water passing through the small opening in the gate B'. This current passing down the spout is but slight and insufficient to prevent fish from ascending the same, its office being to enable the fish to follow the course of the stream. After a number of fish have passed into the tank the gate B is closed and the gate B' opened, thus allowing the fish to pass out into the open higher body of water. The alternate operation of the gates is repeated twice a day, or as often as the quantity of fish require.

The device thus far described is a single tank, and in Fig. 4 I have illustrated a form of double tank, wherein a partition J is arranged lengthwise to divide the tank, so that each part opens into the spout and upstream, and by this means the opening of the gates can be reversed and make a continual entrance and outlet of the tank. Extra large tanks and extra large spouts may have a series of lights of glass set in the same.

The advantages of my improved device is the ease of access for the fish, adaptation to any stream, cheap to construct, and comparatively no water used.

Having thus described my invention, what I claim as new, and desire to secure by Letters Patent, is—

1. In a fishway, the combination, with a tank provided at each end with an opening, of gates for closing said opening, a spout projecting from the downstream end of the tank and inclosing the opening in said end, and a light of glass disposed in the top of the tank and in alignment with the spout, substantially as set forth.

2. In a fishway, the combination of a tank provided at both its ends with gates, the upstream gate having an opening therein affording communication between the exterior and interior of the tank when said gate is closed, a perforated cage provided with an entrance-opening and surrounding the downstream gate, and a spout inclosing the latter gate and projecting from the tank, substantially as set forth.

3. In a fishway, the combination, with a tank provided at each end with an opening, of gates for closing said openings, a spout inclosing the downstream opening and projecting from the tank, and a trap-door provided in the top of the tank, substantially as set forth.

4. In a fishway, the combination, with a tank provided with an opening at each end, of gates for closing said openings, a spout inclosing the downstream opening and projecting from the tank, a light of glass or equivalent material provided in the top of the tank in alignment with the spout, and a trap-door in the tank, substantially as set forth.

5. In a fishway, the combination, with a tank provided at its ends with inlet and outlet openings, respectively, and gates for closing said openings, of a spout projecting from the tank and inclosing the outlet-opening, and a light of glass or equivalent material arranged in the top of the tank and in alignment with the spout, substantially as set forth.

In testimony whereof I affix my signature in presence of two witnesses.

SAMUEL SANDERSON.

Witnesses:
J. M. VELTS,
T. K. TOBIN.